United States Patent [19]

Andrae et al.

[11] Patent Number: 4,556,708

[45] Date of Patent: Dec. 3, 1985

[54] SMOKE-PERMEABLE, NON-REINFORCED FILM BASED ON REGENERATED CELLULOSE FOR MANUFACTURING SAUSAGE CASINGS

[75] Inventors: Klaus Andrae, Zornheim; Max Bytzek, Wiesbaden-Naurod; Elfried Hutschenreuter, Bad Schwalbach; Hans U. Lang, Wiesbaden, all of Fed. Rep. of Germany

[73] Assignee: Hoechst Aktiengesellschaft, Frankfurt am Main, Fed. Rep. of Germany

[21] Appl. No.: 612,342

[22] Filed: May 21, 1984

[30] Foreign Application Priority Data

May 25, 1983 [DE] Fed. Rep. of Germany ....... 3318906

[51] Int. Cl.$^4$ .................. A22C 13/00; F16L 11/00; C08B 16/00
[52] U.S. Cl. .................... 536/57; 264/188; 252/358; 426/105; 426/140; 426/413
[58] Field of Search .................. 536/57; 264/188; 426/105

[56] References Cited

U.S. PATENT DOCUMENTS

| | | | |
|---|---|---|---|
| 2,698,967 | 1/1955 | Reichel et al. | 18/57 |
| 2,991,510 | 7/1961 | Ingersoll | 18/57 |
| 3,083,075 | 3/1963 | Saxton et al. | 264/188 |
| 3,434,913 | 3/1969 | Bockno et al. | 264/188 |
| 4,287,334 | 9/1981 | Fauth et al. | 536/60 |
| 4,396,039 | 8/1983 | Klenk et al. | 138/118.1 |
| 4,399,839 | 8/1983 | Hutschenreuter et al. | 138/118.1 |
| 4,401,135 | 8/1983 | Andrae et al. | 138/118.1 |

FOREIGN PATENT DOCUMENTS

| | | | |
|---|---|---|---|
| 722224 | 11/1965 | Canada | 536/57 |
| EP76436 | 9/1982 | European Pat. Off. | 138/118.1 |
| 2324065 | 1/1974 | Fed. Rep. of Germany | |
| 99494 | 6/1923 | Switzerland | |
| 1002752 | 8/1965 | United Kingdom | |

OTHER PUBLICATIONS

European Search Report.

Primary Examiner—Ronald W. Griffin
Attorney, Agent, or Firm—Schwartz, Jeffery, Schwaab, Mack, Blumenthal & Evans

[57] ABSTRACT

Disclosed is a smoke-permeable, nonreinforced film comprising regenerated cellulose, for manufacturing tubular sausage casings which have a seam extending in the direction of their longitudinal axis. The film has a wet tear strength of from about 18 to 30 N/mm$^2$, both in the longitudinal and transverse directions, a degree of orientation in the range from about 1 to 1.2, and a number of alternate bends ranging from about 5,000 to 8,000 in the longitudinal direction, and from about 9,000 to 16,000, in the transverse direction.

Also disclosed is a process for producing the film in which viscose is extruded in the form of a web, thereafter precipitated by treating it with a heated casting solution and then regenerated into cellulose hydrate gel. The casting solution used to precipitate the viscose comprises, per liter of solution, at least about 160 g of sulfuric acid and at least about 300 g of sodium sulfate and the molar ratio sulfuric acid/sodium sulfate is in the range from about 0.7 to 0.9. In addition, there is disclosed a sausage product comprising a tubular casing of the type described above.

11 Claims, No Drawings

SMOKE-PERMEABLE, NON-REINFORCED FILM BASED ON REGENERATED CELLULOSE FOR MANUFACTURING SAUSAGE CASINGS

BACKGROUND OF THE INVENTION

The present invention relates to a smoke-permeable non-reinforced film based on regenerated cellulose, which has a high tear strength in the longitudinal and transverse directions. The invention also relates to a tubular casing comprising the film and to a process for the production of the film, in which a web-shaped film of viscose is coagulated, regenerated to form cellulose hydrate gel and then dried and thus converted into regenerated cellulose. The film is used for manufacturing the tubular sausage casings by forming a tubing from the web-shaped film and joining it along its edge zones. Additionally, the invention relates to a skinless sausage product which has been formed by a tubular casing comprising the present film.

It has been known for a long time to produce web-shaped, non-reinforced films of regenerated cellulose (cellophane, cellulose hydrate), according to the viscose process, e.g., see U.S. Pat. No. 2,991,510. These films are used for various packaging applications, in particular as wrapping films.

The manufacture of sausage casings from such flat film webs is described in some recent publications, e.g., European Patent Applications No. 0,037,543 and No. 0,058,240. For this purpose, the web is bent to form a tubing and bonded, either along its overlapping edge zones or by means of a film strip which covers the two edge zones. It has now been found, however, that the conventional non-reinforced regenerated cellulose film, i.e. a film without fiber-reinforcement, which is conventionally employed as packaging films, is not suitable for use in the manufacture of a sausage casing having a glued seam, since this film can hardly withstand the mechanical stresses involved in the processing of a sausage casing. In the mechanical production of sausages which are to be smoked, particularly sausages of the cooked-sausage type, the casing material must meet considerably higher mechanical requirements than in the case of other types of packagings. In the stuffing, smoking, scalding and drying procedures, the casing material is stretched to a considerable extent and during portioning, i.e. linking of individual sausages, the material is strongly twisted. Moreover, high-speed mechanical shirring of the tubings into shirred sticks and also the usual mechanical peeling of the tubular casing from the sausage meat to produce skinless cooked sausages (frankfurters or wieners), subject the casing material to high mechanical stresses which the conventional regenerated cellulose films cannot withstand.

As disclosed in European Patent Application No. 0,076,436, a web material of cellulose without fiber-reinforcement which can be employed in manufacturing sausage casings having a glued seam, should have a tear strength in the wet state, which ranges from about 15 to 30 N/mm² (DIN 53 455), both in the transverse and the longitudinal directions, with the tear strength in the transverse direction being equal to or higher than the tear strength in the longitudinal direction. The resulting degree of orientation, i.e., the quotient of tear strength in the longitudinal direction and tear strength in the transverse direction, in each case measured according to DIN 53 455, should have a value of about 1, and preferably, less than 1. According to European Patent Application No. 0,076,436 a film is produced which meets these criteria by conventional longitudinal and/or transverse stretching.

A non-reinforced film of regenerated cellulose having a comparatively high tear strength has the advantage of an improved resistance to certain mechanical stresses, such as those which occur when sausage meat is pressed into the sausage casing and when the sausage is scalded. It has become apparent, however, that high tear strengths alone do not render the conventional films of regenerated cellulose suitable for manufacturing sausage casings having a longitudinal seam, which are to be portioned to give individual sausages, by twisting the casings in the process of stuffing them with sausage meat. Portioning is carried out in such a way that the pressure-loaded, filled section of the tubular casing is repeatedly twisted at particular intervals, corresponding to the desired length of the sausages. In the process, the casing material which is under tension and is moistened throughout, is locally highly stressed, with respect to its splitting resistance and its twisting capability. In addition, the sausage meat must be displaced and pushed away from the part of the casing, which is to be twisted. The conventional cellulose films produced in the form of webs cannot withstand these stresses due to brittleness of the films.

SUMMARY OF THE INVENTION

It is therefore an object of the present invention to provide an improved smoke-permeable, non-reinforced film of regenerated cellulose, which is suitable for manufacturing a sausage casing having a longitudinal seam.

A particular object of the invention is to provide a smoke-permeable, non-reinforced film of regenerated cellulose having an improved resistance to the mechanical stresses acting on the sausage casings during processing.

A further particular object of the present invention is to provide a smoke-permeable, non-reinforced film of regenerated cellulose capable of being twisted when the stuffed sausage casings are portioned, without splitting of the casing material.

It is also an object of the present invention to provide a process for the production of a film of the type described above, which can be performed in a simple manner not requiring expensive stretching operations.

In accomplishing the foregoing objects, there has been provided in accordance with one aspect of the present invention a smoke-permeable, non-reinforced film comprising a regenerated cellulose film having a tear strength of from about 18 to 30 N/mm², as measured in the wet state (water content of from about 60 to 70 percent by weight, based on the total weight of the film), in both the longitudinal and transverse directions, a degree of orientation of the film in the range of from about 1 to 1.2, and wherein the number of alternate bends ranges from about 5,000 to 8,000, in the longitudinal direction, and from about 9,000 to 16,000 in the transverse direction. In preferred embodiments, the tear strength ranges from about 20 to 25 N/mm², the degree of orientation is greater than about 1 and up to about 1.1 and the number of alternate bends ranges from about 5,500 to 7,000 in the longitudinal direction and about 11,000 to 15,000 in the transverse direction.

In accordance with another aspect of the present invention, there has been provided a tubular sausage casing having a seam extending in the direction of its longitudinal axis, which comprises a smoke-permeable, non-reinforced film comprising a regenerated cellulose film as described above in accordance with the first aspect of the present invention.

In accordance with still another aspect of the present invention, there has been provided a process for the production of a smoke-permeable, non-reinforced film comprising regenerated cellulose comprising the steps of providing a viscose solution, extruding the viscose to produce a viscose web, precipitating the viscose web by treating the web with a heated casting solution, wherein the casting solution comprises, per liter of solution, at least about 160 g of sulfuric acid and at least about 300 g of sodium sulfate and wherein the sulfuric acid/sodium sulfate molar ratio ranges from about 0.7 to 0.9.

In preferred embodiments, the sulfuric acid content is in the range from about 160 to 220 g and the sodium sulfate content is in the range from about 300 to 380 g. Furthermore, the temperature of the casting solution is at least about 40° C., preferably at least about 50° C., and more preferably is in the range from about 50° to 60° C.

Still another aspect of the present invention concerns a skinless sausage product formed by a tubular casing of the type described above.

Other objects, features and advantages of the present invention will become more apparent from the detailed description of preferred embodiments which follows.

DETAILED DESCRIPTION OF PREFERRED EMBODIMENTS

The film of regenerated cellulose according to the present invention not only exhibits high tear strength as described in European Patent Application No. 0,076,436, but also exhibits particularly good flexibility. High tear strength values range from about 18 to 30 N/mm$^2$, preferably from about 20 to 25 N/mm$^2$, as measured in the wet state (water content of from about 60 to 70 percent by weight, based on the total weight of the film), both in the longitudinal and transverse directions. High flexibility is demonstrated by the comparatively high number of alternate bends sustained by the film, i.e., from about 5,000 to 8,000, particularly from about 5,500 to 7,000 in the longitudinal direction and from about 9,000 to 16,000, particularly from about 11,000 to 15,000 in the transverse direction, as measured according to DIN 53,374.

Another essential feature of an optimal regenerated cellulose film for the present purposes is its degree of orientation which must have values in the range between about 1 and 1.2, particularly values greater than about 1 and up to 1.1. Surprisingly, however, it is sufficient for the film to have a relatively low orientation in the longitudinal direction, such as the orientation obtained by the customary drawing of the film in the machine direction in the production process. It is not necessary to perform any further stretching of the film, for example, in the longitudinal direction, by means of transport rollers rotating at different speeds or, in the transverse direction, by means of tenters.

Additional essential features of the film include its wet bursting strength and its dimensional behavior in the transition from the substantially dry to the wet state. The wet bursting strength is at least about 8 bar/mm, and is preferably in the range from about 8.5 to 12 bar/mm. As to the latter property, the film, which has been conditioned in a standard atmosphere (water content of from about 6 to 10 percent by weight, based on the total weight of the film) and has thereafter been soaked in water (20° C., 30 min), shows a reduction in length of not more than about 3%, preferably not more than about 1%, and an increase in width of not more than about 5%, preferably not more than about 2%, in each case based on its initial dimensions in standard atmosphere.

The smoke-permeable regenerated cellulose film has a thickness which is customary in sausage casings, i.e. from about 15 to 100 μm, preferably from about 25 to 35 μm. The film substantially comprises cellulose, water and humectant, in the usual amounts.

The film is produced according to the viscose process. As is known, the viscose solution comprises an alkaline solution of sodium-cellulose xanthate, which is usually prepared by reacting cellulose with a sodium hydroxide solution and then reacting the alkali cellulose obtained with carbon disulfide, in an alkaline medium. Swiss Pat. No. 99,494 and European Patent Application No. 0,012,928 described such a solution. After ripening, the viscose is cast, i.e., precipitated or coagulated.

In the casting process, viscose is extruded through slot dies, and the viscose web thus obtained is precipitated and regenerated using a suitable liquid which contains sulfuric acid and sodium sulfate in a dissolved form. Thereafter, the web is washed and dried. The first bath, which serves to precipitate and regenerate the viscose and into which the viscose is extruded in the form of a web, is the so-called casting bath. The casting bath comprises sulfuric acid and sodium sulfate at a molar ratio in the range from about 0.7 to 0.9. The amount of sulfuric acid is at least about 160 g, preferably from about 160 to 220 g, and the amount of sodium sulfate is at least about 300 g, preferably from about 300 to 380 g, in each case per liter of casting bath liquid. The casting bath liquid has a temperature of at least about 40° C., preferably at least about 50° C. and, in particular, of from about 50° C. to 60° C. The casting bath is either contained in a vat through which the viscose web is drawn or, the casting bath liquid is allowed to stream out of nozzles onto the viscose web which has emerged out of the slot die.

By adjusting the casting bath to the conditions which are essential according to the present invention, it is surprisingly and unpredictably possible to achieve a considerable improvement of film properties, in particular, tear strength, degree of orientation, number of alternate bends, wet bursting strength and dimensional behavior.

By this process, the complicated techniques of stretching flat materials, U.S. Pat. No. 2,698,967, for example, and the disadvantages of extruding tubular films, British Patent Application No. 1,002,752, for example, are avoided.

In the baths which follow the regenerating bath, graduated and reduced salt and acid contents are appropriately used and the temperature of the bath should be adjusted in such a way that further coagulation of the cellulose hydrate gel and washing out of impurities are assisted.

Any sulfur which has formed is usually removed in subsequent baths, by means of oxidizing agents, for example, salts of sulfurous acid or of hypochlorous acid. Before the web of cellulose hydrate gel is dried, it is additionally passed through purifying baths to remove acids and salts and also through an aqueous solution containing from about 5 to 20 percent by weight of humectants. Humectants which may be used include the usual polyhydroxy compounds, for example, ethylene glycol, propylene glycol, sorbitol, polyethylene glycols or glycerol. Of these humectants glycerol is preferred for food law reasons. These humectants are contained in the end product in amounts ranging from about 15 to 25 percent by weight, particularly from about 17 to 20 percent by weight. The various treating baths may additionally contain conventional additives, which impart application-related advantages to the end product, for example, improved slip properties, wet strength, fungus resistance, wetability, gloss, printability and the like.

The web material is introduced into heated channels or is guided over a series of heated rolls which are encompassed by the web material, in order to dry the flat web to a final water content of from about 8 to 12%, while simultaneously forming regenerated cellulose. After this drying stage, the web is optionally moistened to equalize its moisture content and is then wound up to relatively large rolls at speeds ranging from about 50 to 100 m/min., preferably from about 60 to 70 m/min. This is done in such a way that strong tensions in the longitudinal direction are avoided to a large extent.

The following example illustrates the effect of the amounts of acid and salt and the acid/salt molar ratio contained in the casting bath, and also the temperature of the casting bath on the properties of the cellulose web obtained. Additionally, the example illustrates how these properties, in turn, influence the results achieved in the production of sausages, when these films are used to manufacture sausage casings having a glued seam.

EXAMPLE

An aqueous, alkaline viscose solution (100 parts by weight) is prepared in a manner which is known in the art. For this purpose, 7 parts by weight of processed wood pulp, ®Buckeye V5 ELG (manufacturer Buckey, USA), are reacted with 5.8 parts by weight of sodium hydroxide to form alkali cellulose and the alkali cellulose is then reacted with 2.1 parts by weight of carbon disulfide to produce cellulose xanthate.

In a conventional cellophane casting machine, including casting and treating baths and a drying zone, the ripened and outgassed viscose is cast into a clear film which substantially comprises cellulose, humectant and water. In the process, viscose is extruded under pressure, through a slot die into the casting bath which comprises a heated aqueous solution of sulfuric acid and sodium sulfate. The temperatures and concentrations of this solution are varied as indicated in Table 1. Samples 1 and 2 in Table 1 are reference samples. In Sample 1, the acid/salt molar ratio is higher than the preferred range, while in Sample 2, the concentrations of acid and salt are lower than the preferred range. The temperature of the casting bath used for Sample 3 is not within the preferred range. Samples 4 and 5, which are prepared under optimum conditions, show excellent properties.

TABLE 1

| Sample | Casting Bath | | | |
| --- | --- | --- | --- | --- |
| | $H_2SO_4$ g/l | $Na_2SO_4$ g/l | Molar Ratio Acid/Salt | Temperature °C. |
| 1 | 205 | 305 | 0.97 | 52 |
| 2 | 135 | 234 | 0.84 | 52 |
| 3 | 185 | 320 | 0.84 | 42 |
| 4 | 185 | 320 | 0.84 | 52 |
| 5 | 166 | 305 | 0.79 | 52 |

During customary dwell time of, for example, about 5 s, in the casting bath the viscose web begins to solidify, forming cellulose hydrate gel in the process. The web of cellulose hydrate gel is then passed over a plurality of guide and deflector rolls through further acidic and neutral purifying baths at temperatures in the range from about 50° C. to 60° C. Thereafter, the web is freed from any residual amounts of sulfur, by passing it through an aqueous bath heated at 65° C., which contains from 1 to 2 g of sodium sulfite per liter of liquid and is adjusted to an alkaline pH of 9.5.

Passing the web of cellulose hydrate gel through another seven aqueous baths at temperatures of from 40° C. to 55° C. serves to further purify the web, which is finally treated in a bath heated at 55° C. and containing a nine percent by weight strength aqueous solution of glycerol. The web which is now provided with a humectant is then guided over a plurality of rolls heated at 65° C. to 70° C. and is dried to its final moisture content. The regenerated cellulose web thus obtained is continuously wound up at a speed of 60 m/min.

All samples contain 17 percent of glycerol and 9 percent of water and have a weight per unit area of 40 g/m². After storing in a standard atmosphere (DIN 50014, 23° C. and 50% r.h.), the samples are tested for mechanical properties.

The number of alternate bends is determined according to DIN 53374, using 15 mm wide strips of regenerated cellulose loaded at 1,200 g and is expressed as the number of reverse flexures performed at a frequency of 500/min. until breaking occurs.

For determining the tear strength in the wet state, test strips having a width of 15 mm and a length of 100 mm are cut from the web of regenerated cellulose, in parallel with and transverse to the machine direction. These strips are immersed in water at about 20° C. for 30 minutes. Immediately after soaking (water content of the test specimen 60 to 70 percent by weight, based on its total weight), the strips are extended between the grips of an electronic tensile testing machine (according to DIN 53455) until breaking occurs. In the test, the distance between grips is 50 mm and the rate of extension is 50 mm/min. The force (N) measured at break is calculated in relation to the cross-section (mm²) of the wet test specimen to give the tear strength in N/mm². Tear strength is thus to be understood as denoting the resistance of the test specimen to the tensile stress occuring at the moment of breaking.

The bursting strength in the wet state is determined in a bursting test, according to DIN 53141 (part 2). For this purpose flat pieces cut from the regenerated cellulose web are immersed in water at about 20° C. for 30 minutes and are then clamped into a chamber formed of clamping rings, such that the test specimen has a circular shape. Then over-pressure is applied on one side of the specimen and expanded until bursting occurs. The over-pressure (bar) measured at the moment of bursting is divided by the wet thickness (mm) of the test specimen to give the specific bursting strength (bar/mm).

The dimensional behavior is tested with the aid of test specimens cut in the form of squares at a side length of 100 mm. These specimens are immersed in water at about 20° C. and the resulting change in side length of the squares is determined after a period of 30 min.

The data obtained for Samples 1 to 5 are compiled in Table 2.

TABLE 2

| | Properties of Flat Material | | | | | | | |
|---|---|---|---|---|---|---|---|---|
| | Wet Tear Strength (N/mm$^2$) | | Degree of Orientation | Specific Bursting Strength (bar/mm) | Number of Alternate Bends | | Dimensional Behavior (%) | |
| Sample | long. | transv. | | | long. | transv. | long. | transv. |
| 1 | 20.6 | 17.6 | 1.17 | 7.4 | 4,600 | 7,900 | −1 | +3 |
| 2 | 18.8 | 11.7 | 1.61 | 5.0 | 2,400 | 5,400 | −3 | +5 |
| 3 | 21.8 | 18.6 | 1.17 | 8.2 | 5,900 | 10,100 | −1 | +2 |
| 4 | 22.8 | 22.4 | 1.02 | 9.75 | 6,600 | 14,700 | −1 | +1 |
| 5 | 20.9 | 20.9 | 1.00 | 9.2 | 5,600 | 12,600 | −1 | +1 |

In Samples 1, 2 and 3, the wet tear strengths in the transverse direction have decreased to values below 19 N/mm$^2$, which results in degrees of orientation, expressed as the quotients of tear strengths in the longitudinal and transverse directions, which are greater than 1.1. The specific bursting strengths drop to values below 8.5 bar/mm. The values measured for the numbers of alternate bends, particularly transverse to the direction of the web, show a strong decrease and are only marginally sufficient in Sample 3.

The temperature of the casting bath used for Samples 1 and 2, which has been raised to 52° C. and is thus in the preferred temperature range, does not ensure that the desired mechanical properties are obtained, since the molar ratio of acid/salt is too high in Sample 1 and the acid and salt concentrations are too low in Sample 2. Samples 1 and 2 show particularly low wet tear strengths in the transverse direction, low wet bursting strengths, and unsatisfactory numbers of alternate bends.

Samples 4 and 5 exhibit comparatively high values of wet tear strength, above 20 N/mm$^2$, and optimum degrees of orientation. The bursting strengths measured in the wet state are definitely higher than 8.5 bar/mm. The dimensional behavior of these samples is nearly balanced and the values obtained for the numbers of alternate bends are greater than 5,500 in the longitudinal direction and greater than 11,000 in the transverse direction.

The flat materials of regenerated cellulose corresponding to Samples 1 to 5 are cut into 59 mm wide strips which are used to form tubings, according to the technique described in German Offenlegungsschrift No. 3,145,967. The tubings so produced have a flat width of 28 mm, their edges being overlapped by 3 mm. The overlapped areas are glued by means of an aqueous two-component adhesive comprised of ®Resamin HW 601 (manufacturer Cassella, Federal Republic of Germany), according to Example 1 if European Patent Application No. 0,076,436, while, simultaneously, an emulsion which facilitates the subsequent peeling, is applied to the internal walls of the tubings. The tubings are wound up and stored for five days, and are then shirred into sticks on a conventional shirring device.

The sticks produced from an initial tubing length of 26 m have a shirred length of 400 mm (shirring ratio 65:1) and show a spirally displaced seam. The sticks are used in processing experiments to determine their behavior upon stuffing, portioning, smoking, scalding and peeling.

Sausage meat, such as typically used in the production of skinless frankfurters, is employed in stuffing tests carried out on two different automatic stuffing and portioning machines.

(1) Shirred sticks are placed on a stuffing horn which has a diameter of 11.2 mm and carries a stuffing head having a diameter of 19.5 mm at its orifice. The sticks are then continuously stuffed and deshirred in the process producing uninterrupted sausage length of 26 m in each case. On a so-called "linking machine", these lengths are automatically tied at intervals of 18 cm, using short pieces of string.

(2) Shirred sticks which have previously been closed at one end are placed on a stuffing horn having a diameter of 10.7 mm and are stuffed in such a way that the stuffing horn is extended into a hollow channel of the shirred stick and the stick is caused to rotate about its axis, with the emerging sausage meat deshirring the stick. The filled, rotating casing is seized by holding means which automatically engage the casing at intervals of 21 cm and, as a result, the casing is twisted and thus portioned.

The strings of sausages stuffed according to methods (1) and (2) are suspended in a smoke house in the form of loops. They are dried and smoked and thereafter scalded by exposing them to steam and cooled with water. In the smoking and scalding process, a second skin of coagulated protein mass forms on the surface of the sausage, below the sausage casing. After briefly moistening in a water bath, the casing is peeled from the second skin of the sausage. The sausages produced according to method (1) are peeled in a semi-automatic device and the sausages produced according to method (2) are peeled in an automatic high-speed peeler. The peeled sausages are also called skinless sausages. To evaluate the sausage casings, their expandability in the stuffing procedure, i.e., the resulting stuffing diameter, and their defects in the form of holes, tears, breaks or other faults occurring during stuffing, portioning, smoking, scalding, etc. are determined.

Faults occurring in the peeling procedure, for example, breaking of the casing material so that it cannot be continuously removed, are also taken into consideration in the evaluation.

Table 3 gives the stuffing diameters and the frequency of defects in the processing of the shirred sausage casings of Samples 1 to 5. To facilitate comparison, the numbers of defects are indicated per 1,000 m of deshirred tubing length.

TABLE 3

| | | Behavior upon Stuffing | | | |
|---|---|---|---|---|---|
| | | Defects per 1,000 Running Meters of Tubing upon | | | |
| Tubing Sample | Stuffing Diameter mm | Filling and Tieing (1) | Filling and Twisting (2) | Smoking, Scalding etc. | Peeling |
| 1 | 20.4–20.9 | 2 | 2 | 0 | 0 |
| 2 | 21.1–22.5 | 16 | 10 | 3 | 15 |
| 3 | 20.3–20.7 | 1 | 1 | 0 | 0 |
| 4 | 20.3–20.5 | 0 | 0 | 0 | 0 |
| 5 | 20.2–20.5 | 0 | 0 | 0 | 0 |

It is found that only the preferred materials of Samples 4 and 5 and the shirred sticks produced from these materials, respectively, enable trouble-free stuffing and processing and yield constant stuffing diameters.

Samples 1, 2 and 3 give rise to defects in the tieing and twisting operations. In Sample 2, the number of defects is particularly high, due to weaknesses in the material; its stuffing diameters vary considerably and are too great. Sample 3 is only marginally acceptable.

What is claimed is:

1. A smoke-permeable, non-reinforced film comprising a regenerated cellulose film produced by precipitating a viscose web with a heated casting solution comprising, per liter of solution, at least about 160 g of sulfuric acid and at least about 300 g of sodium sulfate, wherein the sulfuric acid/sodium sulfate molar ratio ranges from about 0.7 to 0.9, wherein said film has a tear strength of from about 18 to 30 N/mm$^2$, as measured in the wet state (water content of from about 60 to 70 percent by weight, based on the total weight of the film), in both the longitudinal and transverse directions, and a degree of orientation in the range of from about 1 to 1.2.

2. A film as claimed in claim 1, wherein said solution comprises, per liter of solution, from about 160 to 220 g of sulfuric acid.

3. A film as claimed in claim 1, wherein said solution comprises, per liter of solution, from about 300 to 380 g of sodium sulfate.

4. A film as claimed in claim 1, wherein the number of alternate bends of said film ranges from about 5,000 to 8,000, in the longitudinal direction, and from about 9,000 to 16,000 in the transverse direction.

5. A film as claimed in claim 4, wherein the tear strength ranges from about 20 to 25 N/mm$^2$, the degree of orientation of the film ranges from about 1 to 1.1 and the number of alternate bends ranges from about 5,500 and 7,000, in the longitudinal direction, and from about 11,000 to 15,000, in the transverse direction.

6. A film as claimed in claim 1, wherein the film has a wet bursting strength of at least about 8 bar/mm.

7. A film as claimed in claim 3, wherein the wet bursting strength ranges from about 8.5 to 12 bar/mm.

8. A film as claimed in claim 1, wherein the film, which has been conditioned in standard atmosphere (water content of from 6 to 10 percent by weight, based on the total weight of the film) and has thereafter been soaked in water at 20° C. for 30 min, has a reduction in length of not more than about 3%, and an increase in width of not more than about 5%, in each case based on its initial dimension in standard atmosphere.

9. A film as claimed in claim 2, wherein the reduction in length is about 1% and the increase in width is about 2%.

10. A tubular sausage casing having a seam extending in the direction of its longitudinal axis, which comprises a smoke-permeable, non-reinforced film as defined in claim 1.

11. A sausage product comprising a tubular artificial sausage casing which includes a film as defined in claim 1 containing therein a semi-solid sausage filling, said casing being peelable from said filling.

* * * * *